Nov. 23, 1965     W. E. HOOPER     3,219,120

VIBRATION ABSORBING SYSTEM

Filed Dec. 31, 1964     4 Sheets—Sheet 1

INVENTOR.
WILLIAM EUAN HOOPER
BY Visek and McDonnell

ATTORNEYS

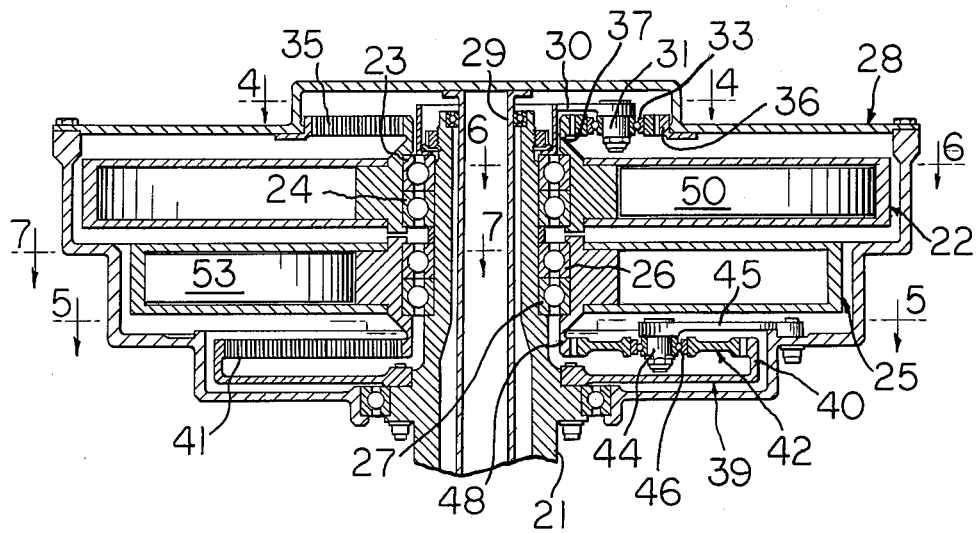

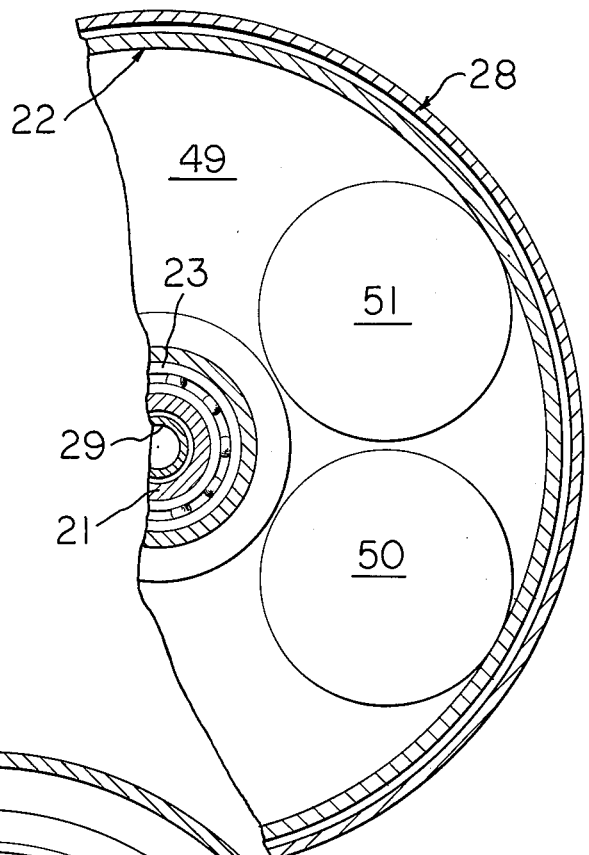
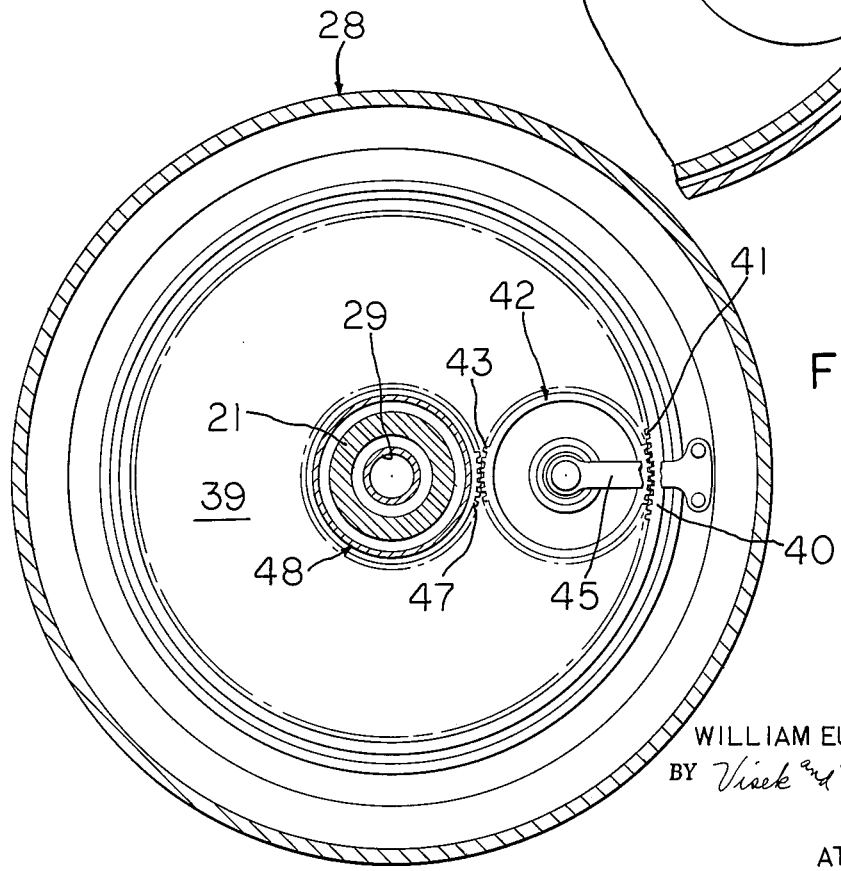

Nov. 23, 1965   W. E. HOOPER   3,219,120
VIBRATION ABSORBING SYSTEM
Filed Dec. 31, 1964   4 Sheets-Sheet 4

INVENTOR.
WILLIAM EUAN HOOPER
BY Visek and McDonnell
ATTORNEYS

United States Patent Office 3,219,120
Patented Nov. 23, 1965

3,219,120
VIBRATION ABSORBING SYSTEM
William Euan Hooper, Springfield, Pa., assignor to The Boeing Company, Seattle, Wash., a corporation of Delaware
Filed Dec. 31, 1964, Ser. No. 422,830
18 Claims. (Cl. 170—159)

This invention relates to a vibration absorbing system and, more particularly, to a vibration absorbing system which may be applied to structures possessing certain commonly satisfied dynamic properties.

One problem in rotary wing aircraft such as helicopters, for example, is the vibrations, which result from the transitional and forward flight of the helicopter and are transmitted to the fuselage through the rotor hub. These vibrations result from the asymmetrical air flow through the rotor wherein the advancing blade encounters higher velocity air than the retreating blade because of the relative movement of the helicopter.

Because of this asymmetrical air flow, each blade of a helicopter rotor experiences a periodic variation of lift as it rotates in azimuth. The combination of this aerodynamic force with the dynamic forces, which result from blade motion, causes periodic forces to be applied to the hub by each of the rotor blades.

The forces, which are applied to the hub, may be expressed as a harmonic (Fourier) series. Because of the symmetrical angular spacing of the rotor blades of a helicopter rotor, the hub forces sum in such a fashion that the predominant force emerging from the rotor blades and into the fuselage through the rotor hub occurs at frequencies of $n$, $2n$, $3n$, etc. times the rotor speed where $n$ is the number of rotor blades.

While forcing also occurs at all other multiples of rotor speed because of the inevitable lack of similarity between the rotor blades, the principal forcing frequencies, which are experienced in most helicopters, are those that are a multiple of the product of the rotor speed and the number of blades attached to the rotor hub. Furthermore, the frequency at which the principal forcing occurs is usually equal to the product of the rotor speed times the number of blades.

If the natural frequency of the fuselage is near one of the forcing frequencies, a helicopter can be subjected to a sufficient vibration level so as to have its performance limited because of both crew and structural fatigue caused by the vibrations. These vibrations normally reach their maximum values at transition, which is approximately 20 to 60 knots, and at high forward speed.

The present invention satisfactorily solves the foregoing problem by providing a vibration absorbing system, which reduces the vibratory motion of the helicopter structure to near zero at the point to which it is attached and significantly decreases the vibration level at most other points in the helicopter fuselage structure. Since the rotor hub is the point at which the largest forces causing the vibrations are applied, the hub is the appropriate place to mount the vibration absorber of the present invention in order to reduce the vibratory motion of the fuselage.

Since the forces created in any plane by the rotor blades have an elliptical locus in general and rotate in either direction, the present invention substantially balances out these forces by utilizing two circular counter-rotating weight means, which may have unequal loci. The counter-rotating weight means could have the same locus if the vector components of the resultant centrifugal forces created by the counter-rotating weight means were different.

If there should be any change in either the phase or the amplitude of the forcing, this changes the shape of the elliptical force locus. However, the counter-rotating weight means with unequal loci of the present invention automatically compensate for such change.

The present invention can substantially eliminate the vibrations in any plane such as a longitudinal-lateral plane, a vertical-longitudinal plane, or a vertical-lateral plane, for example. The selected plane depends upon which of the vibration producing forces it is desired to cancel. Furthermore, cancellation in three orthogonal directions, which would result in complete cancellation of linear vibrations, can be achieved with the present invention by utilizing three shafts arranged so that any plane through the system can include counter-rotating projections from these shafts and their weight means.

Accordingly, an object of this invention is to provide a vibration absorber for reducing vibrations of a structure created, for example, by radial members of a rotating hub at the rotating hub.

Another object of this invention is to provide a device for substantially balancing out the vibration forces, which may occur at a frequency different than the frequency of a rotating member creating the vibration forces.

A further object of this invention is to provide a vibration absorber that is capable of automatically adapting to any change in amplitude, phase, or frequency of the vibration forces.

Still another object of this invention is to provide a device for substantially balancing out the vibration forces, created by the rotor blades, at a rotor hub of a rotary wing aircraft before the forces enter the fuselage of the aircraft.

A still further object of this invention is to reduce vibrations at any point in the structure of a rotary wing or other aircraft.

Other objects of this invention will be readily perceived from the following description, claims, and drawings.

This invention relates to the combination of a rotating hub, a plurality of radial members attached to the hub for rotation therewith, the radial members being substantially symmetrically disposed with respect to each other, and a vibration absorber for substantially balancing out vibrations created at the hub by the radial members. The vibration absorber includes weight means having at least two weights movable in a plane along a circular path of fixed radius. The weights are angularly movable with respect to each other in response to the vibrations being substantially balanced out. Means connected to the weight means cause rotation of the weight means at a speed equal to a constant ratio of the speed of the hub other than a ratio of one to one.

The attached drawings illustrate preferred embodiments of the invention, in which:

FIGURE 3 is a sectional view, partly in elevation, of one form of the vibration absorber of the present invention;

FIGURE 4 is a sectional view, partly in plan, of the gearing arrangement for rotating one of the weight support housings of the vibration absorber of FIGURE 3 and taken along line 4—4 of FIGURE 3;

FIGURE 5 is a sectional view, partly in plan, of the gearing arrangement for rotating the other of the weight support housings of the vibration absorber of FIGURE 3 and taken along line 5—5 of FIGURE 3;

FIGURE 6 is a sectional view, partly in plan, taken along the line 6—6 of FIGURE 3 and showing one position of one set of the weights within their support housing;

FIGURE 7 is a sectional view, partly in plan, taken along the line 7—7 of FIGURE 3 and showing one position of the other set of weights within their support housing.

Figure 1:
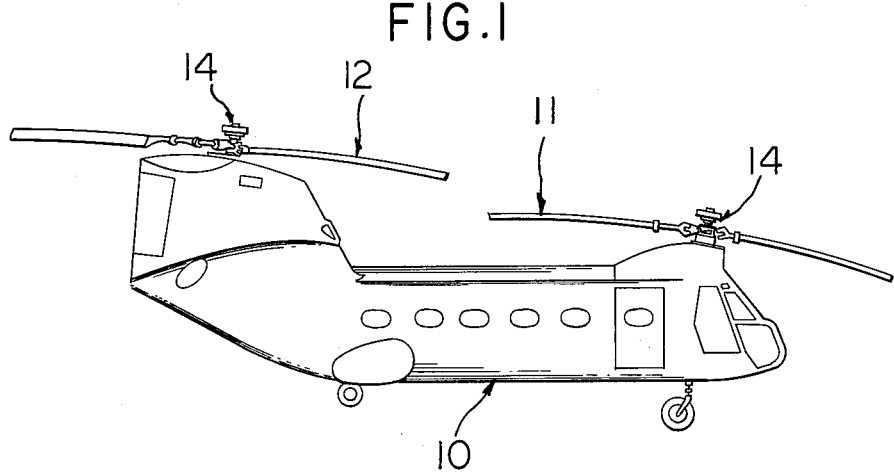
FIGURE 1 is a side elevational view of a helicopter with a vibration absorber of the present invention disposed on top of each set of rotor blades.
Figure 2:
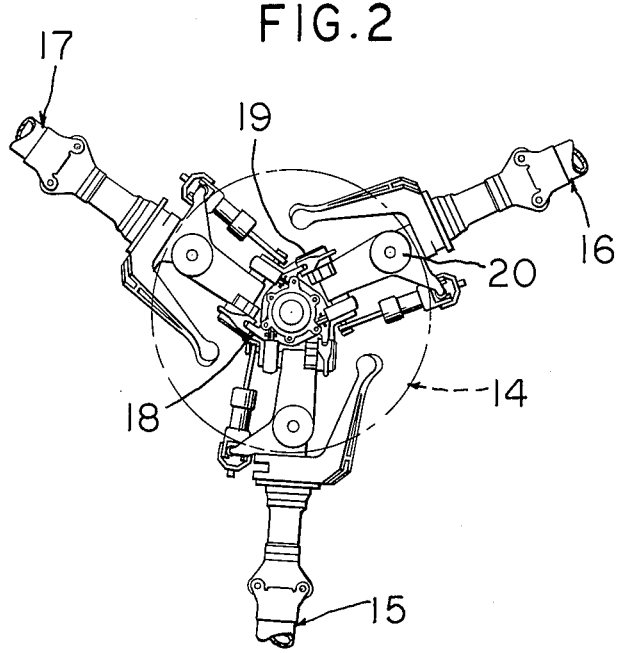
FIGURE 2 is a top plan view of the forward set of rotor blades of the helicopter of FIGURE 1 with the outline of a vibration absorber of the present invention indicated in phantom thereon.

Referring to the drawings and particularly to FIGURES 1–3, there is shown a helicopter 10 having a forward set 11 of rotor blades and a rear or aft set 12 of rotor blades. Each of the sets 11 and 12 of rotor blades has a vibration absorber 14 disposed on top thereof.

As shown in FIGURE 2, the forward set of rotor blades 11 comprises three rotor blades 15, 16, and 17, which are substantially symmetrically disposed with respect to each other. Each of the rotor blades 15, 16, and 17 is connected to a rotor hub 18, which drives the rotor blades. Each of the rotor blades 15, 16, and 17 is movable in a vertical plane about a flap hinge 19 and in a horizontal plane about a lead-lag hinge 20.

The rear or aft set 12 of rotor blades is driven in the same manner as the forward set 11 of rotor blades and has the same number of rotor blades, which are symmetrically disposed with respect to each other. While the two sets of rotor blades have been shown in a tandem arrangement, it should be understood that they could be disposed coaxially if desired. Furthermore, if desired, only a single set of rotor blades may be employed in the well-known manner. Likewise, while the blades have been described as movable about the flap hinge 19 and the lead-lag hinge 20, the blades could be rigid with the rotor hub or movable about a single articulated joint. The number of rotor blades, which are radial members, has been shown as three in each set but this could be any number.

Referring to FIGURE 3, there is shown an annular shaft 21, which is driven by the rotor head 18 (see FIGURE 2) and attached thereto in any suitable manner. A support housing 22 is rotatably mounted on the shaft 21 by bearings 23 and 24. A second support housing 25, which has a smaller outer diameter than the housing 22, is rotatably mounted on the shaft 21 by bearings 26 and 27. The shaft 21 and the housings 22 and 25 are enclosed within a housing 28, which is secured to the fuselage of the helicopter by suitable means (not shown) through an annular member 29.

The housings 22 and 25 are rotated at a speed equal to the frequency of the vibration, which it is desired to cancel. In this case, when three times the rotor speed is the critical frequency, the housings 22 and 25 rotate at three times the speed of the rotor hub 18 and the connecting shaft 21. Furthermore, the housings 22 and 25 rotate in opposite directions with the housing 22 rotating in the same direction as the shaft 21 while the housing 25 rotates in the opposite direction to the rotation of the hub 18 and the shaft 21.

As shown in FIGURES 3 and 4, the shaft 21 has an arm 30 attached thereto adjacent the upper end of the shaft 21 for rotation therewith. The arm 30 has a downward projection 31, which functions as a planet carrier for a planet gear 32 rotatably mounted thereon by a bearing 33. The planet gear 32 has teeth 34 for meshing with teeth 35 on an annular member 36, which is fixed to the housing 28 and functions as a ring gear.

The housing 22 has an upwardly extending annular member 37, which has teeth 38 on its exterior surface for meshing with the teeth 34 of the planet gear 32. The annular member 37 functions as a sun gear.

The foregoing gearing arrangement results in clockwise rotation of the shaft 21 causing clockwise rotation of the housing 22. The clockwise rotation of the shaft 21 moves the arm 30 clockwise whereby the planet gear 32, which is carried clockwise by the arm 30, rotates counter-clockwise because of its engagement with the teeth 35 on the fixed annular member 36. The counter-clockwise rotation of the planet gear 32 causes clockwise rotation of the member 37 and the housing 22 to which the member 37 is attached.

The number of the teeth 35 on the member 36, the teeth 34 on the planet gear 32, and the teeth 38 on the member 37 is arranged with respect to each other so that the member 37 rotates at three times the speed of the rotation of the shaft 21. Of course, if the number of rotor blades on the rotor hub 18 were two, for example, then the number of teeth would be selected to cause rotation of the housing 22 at only twice the speed of the shaft 21. Similarly, if there were four rotor blades attached to the rotor hub 18, then the number of teeth would be arranged with respect to each other so that the speed of the housing 22 would be four times the speed of the rotor hub 18.

Referring to FIGURES 3 and 5, the gearing arrangement for causing rotation of the housing 25 in the opposite direction to rotation of the shaft 21 and the rotor hub 18 is shown. An annular member 39 is attached to the lower portion of the shaft 21 for rotation therewith. The annular member 39 has an upwardly extending annular portion 40 at its outer end. The annular portion 40 has a plurality of teeth 41 disposed thereon whereby the portion 40 functions as a ring gear.

A planet gear 42, which has a plurality of teeth 43 thereon for meshing with the teeth 41 of the portion 40 of the member 39, is rotatably mounted on a downward extension 44 of an arm 45 by a bearing 46. The arm 45 is fixed to the housing 28 so that the arm 45 is not movable. The teeth 43 of the planet gear 42 also mesh with teeth 47 on a downwardly extending annular member 48 of the housing 25.

The foregoing gearing arrangement results in clockwise rotation of the shaft 21 causing the portion 40 to rotate clockwise whereby the planet gear 42 is driven clockwise. Clockwise movement of the planet gear 42 results in counter-clockwise rotation of the annular member 48, which functions as the sun gear, so that the housing 25 rotates counter-clockwise. Thus, the housing 25 rotates in the opposite direction to the rotation of the rotor hub 18 and the housing 22.

The relation of the number of the teeth 41 on the portion 40, the teeth 43 on the planet gear 42, and the teeth 47 on the annular member 48 is arranged so that the housing 25 rotates at three times the speed of rotation of the rotor hub 18. Of course, if the number of blades were other than three, then the relationship of the number of teeth would be varied so that the speed of the housing 25 would be equal to the product of the speed of the rotor hub 18 and the number of rotor blades attached to the rotor hub 18.

As shown in FIGURE 6, the housing 22 has an annular chamber 49 in which are disposed at least two cylindrical members 50 and 51, which function as weight means. The cylindrical members or weights 50 and 51 are movable within the annular chamber 49, which functions as an annular track to provide a circular path of fixed radius for the members 50 and 51, so that the cylindrical members 50 and 51 are positioned to provide one of the components for reducing the vibrations, which are created at the rotor hub 18 by the rotor blades 15, 16, and 17.

The forcing, created by the rotor blades 15, 16, and 17 at the rotor hub 18, has an elliptical locus. Thus, the cylindrical members 50 and 51 provide one of the counter-rotating components, which are employed to balance out the elliptical locus of the force and the resultant vibratory motion.

The cylindrical members 50 and 51 may move with respect to each other depending on the value of the component required by them; this depends on the vibratory motion of the rotor hub 18 as a result of the forcing applied by the rotor blades. Thus, if the cylindrical members 50 and 51 are providing too large a component, they move away from each other.

Furthermore, if desired, the annular chamber 49 may be partially filled with a liquid to assist the cylindrical members 50 and 51 when the rotor hub 18 is starting and to provide damping for the cylindrical members 50 and 51 when the hub 18 is rotating. During rotation of the rotor hub 18, the cylindrical weights 50 and 51 are positioned above the bottom of the housing 22 (see FIGURE 3) and urged against the outer wall of the annular chamber 49 because of the centrifugal forces.

As shown in FIGURE 7, the housing 25 has an annular chamber 52 in which is disposed at least two cylindrical members 53 and 54, which function as weight means. The cylindrical members or weights 53 and 54 are movable within the annular chamber 52, which serves as an annular track for the cylindrical members 53 and 54 to provide a circular path of fixed radius.

The cylindrical members 53 and 54 form the other counter-rotating component, which cooperates with the component formed by the cylindrical members 50 and 51, to balance out the vibratory motion, which occurs in an elliptical locus due to the vibrations created at the rotor hub 18 by the rotor blades 15, 16 and 17. It should be observed that the cylindrical members 53 and 54 are smaller than the cylindrical members 50 and 51 although they could be the same size. Furthermore, the cylindrical members 53 and 54 have a locus, which is smaller than the locus of the cylindrical members 50 and 51, because of the smaller outer diameter of the housing 25. Thus, the elliptical locus of the vibratory motions is synthesized by the two circular counter-rotating and unequal loci.

However, it should be understood that it is not necessary for the cylindrical members 53, 54 to have a different locus than the cylindrical members 51, 52 to synthesize an elliptical locus. The counter-rotating weight means have the capability of producing elliptical force loci varying from zero with the elliptical locus having any ratio of major to minor axis in any desired direction by varying the resultant centrifugal force components created by the counter-rotating weight means.

The position of the cylindrical members 53 and 54 may be varied from that shown in FIGURE 7 depending upon the forcing created at the rotor hub 18 by the rotor blades 15, 16, and 17. Thus, if the amplitude of the vibratory motion decreases, then the component required by the cylindrical members 53 and 54 is reduced and the cylindrical members 53 and 54 move away from each other in the same manner as described with respect to the members 51 and 52. Likewise, if the phase of the vibratory motion changes, the cylindrical members 53 and 54 automatically change their positions in the annular chamber 52 with respect to the positions of the cylindrical members 50 and 51 in the annular chamber 49. Of course, the cylindrical members 50 and 51 also are changing their positions in the annular chamber 49 to compensate for the change in phase.

During rotation, the cylindrical members 53 and 54 are disposed in engagement with the outer wall of the annular chamber 52 and are positioned above the bottom of the annular chamber 52 because of the centrifugal forces. If desired, the annular chamber 52 may be partially filled with a liquid to assist the cylindrical members 53 and 54 when the rotor hub 18 is starting and to provide damping for the cylindrical members 53 and 54 when the hub 18 is rotating.

In the modification of FIGURE 3, the axes of rotation of the rotor hub 18 and the shaft 21, the housing 22, and the housing 25 are coaxial. Thus, the vibration absorber of FIGURE 3 is employed to reduce the vibrations, which are created at the rotor hub 18 in the lateral and longitudinal plane by the rotor blades 15, 16, and 17.

Considering the operation of the vibration absorber of FIGURE 3 to substantially balance out the vibrations, which are created at the rotor hub 18 in the longitudinal-lateral plane by the rotor blades 15, 16, and 17, the housing 22 rotates in the same direction as the rotor hub 18 while the housing 25 rotates in the opposite direction. This results in counter-rotating and unequal force loci being provided by the cylindrical members 50 and 51 and the cylindrical members 53 and 54. If either the phase or amplitude of the vibrations created at the rotor hub 18 changes, then the positions of the cylindrical members 50 and 51 in the annular chamber 49 and/or the positions of the cylindrical members 53 and 54 in the annular chamber 52 are varied to compensate for this change in phase or amplitude.

Figure 8:
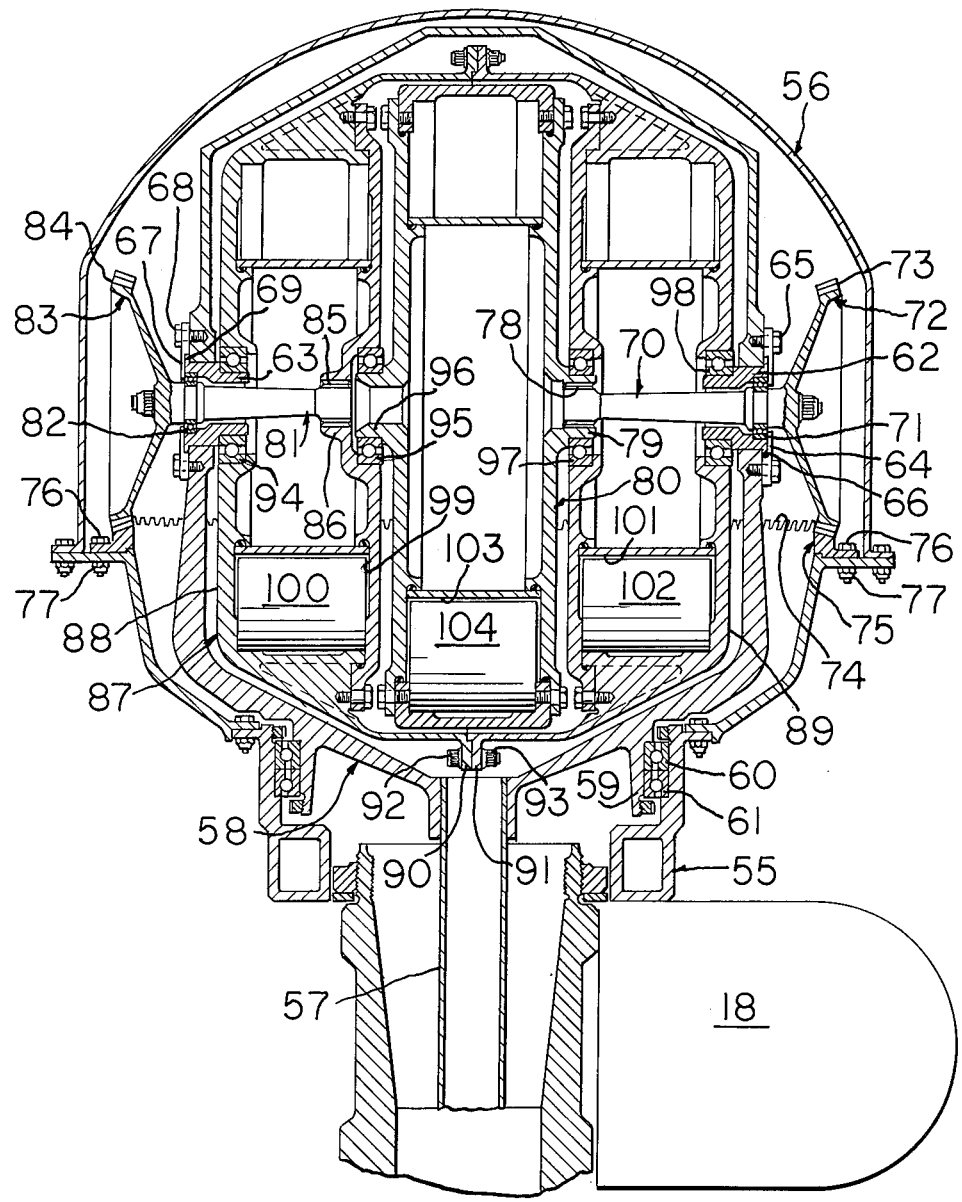
FIGURE 8 is a sectional view, partly in elevation, of another embodiment of the vibration absorber of the present invention.

If it is desired to substantially balance out vibrations, which are created at the rotor hub 18 by the rotor blades 15, 16, and 17 in a vertical-lateral plane or a vertical-longitudinal plane, then the vibration absorber of FIGURE 8 is employed. In the embodiment of FIGURE 8, the hub 18 has an annular member 55, which forms the base of a housing 56, attached thereto for rotation therewith at the same speed as the hub 18. The housing 56 completely encloses the remainder of the vibration absorber of FIGURE 8.

The vibration absorber of FIGURE 8 includes a fixed annular member 57, which is secured to the fuselage of the helicopter 10 by suitable means (not shown) at the lower end of the member 57. An annular member 58 is attached at its lower end by welding or other suitable means to the upper end of the annular member 57. The housing 56 is rotatably mounted around an annular projection 59, which extends downwardly from the member 58, by bearings 60 and 61.

The annular member 58 has diametrically opposed openings therein to support annular members 62 and 63. A member 64, which is secured to the member 58 by suitable fastening means such as screws 65, for example, engages a flange 66 on the annular member 62 to retain the annular member 62 within one of the diametrically opposed openings in the member 58. A member 67, which is secured to the member 58 by suitable fastening means such as screws 68, for example, retains the member 63 within the other of the diametrically opposed openings in the member 58 by engaging a flange 69 on the member 63.

A shaft 70 passes through the annular member 62 and is rotatably supported therein by a bearing 71. A gear 72 is connected to one end of the shaft 70 exterior of the member 58. The gear 72 has teeth 73 thereon for cooperation with teeth 74 on an annular member 75, which is fixed to the housing 56 by suitable fastening means such as bolts 76 and 77. Thus, the shaft 70 is rotated whenever the housing 56 is rotated by the hub 18.

The ratio of the teeth 73 to the teeth 74 is selected so that the shaft 70 rotates at a speed equal to the frequency of the vibrations, which it is desired to cancel. In this case, since the principal forcing, which it is desired to cancel, occurs at a speed equal to the product of the speed of rotation of the hub 18 and the number of rotor blades being driven by the hub 18, the speed of rotation of the shaft 70 is three times the speed of rotation of the hub 18. Of course, if the critical frequency is different, then the speed of rotation of the shaft 70 would be changed; for example, if there were four rotor blades attached to the hub 18 and the critical frequency was equal to the product of the rotor hub 18 and the number of blades attached to the hub 18, then the speed of rotation of the shaft 70 would be four times the speed of the hub 18. This would be compensated for by changing the ratio of the teeth 73 to the teeth 74.

The other end of the shaft 70 is spline connected at 78 to an annular projection 79 of a housing 80. Thus, the housing 80 rotates at the same speed as the shaft 70.

A shaft 81 extends through the annular member 63 and is rotatably supported therein by a bearing 82. The end of the shaft 81, which is exterior of the member 58, has a gear 83 attached thereto. The gear 83 has teeth 84 thereon for meshing with the teeth 74 on the annular member 75 of the housing 56. The ratio of the teeth 84 to the teeth 74 is the same as the ratio of the teeth 73 to the teeth 74 so that the speed of rotation of the shaft 81 is the same as the speed of rotation of the shaft 70. However, since the gears 72 and 83 are diametrically opposed to each other, the directions of rotation of the shaft 70 and 81 are opposite to each other.

The other end of the shaft 81 is spline connected at 85 to an annular portion 86 of a housing 87. The housing 87 includes a first section 88 and a second section 89, which are connected together along cooperating flanges 90 and 91, respectively, by suitable fastening means such as bolts 92 and nuts 93, for example.

The section 88 of the housing 87 has one side rotatably mounted on the annular member 63 by a bearing 94 while the other side is rotatably mounted through a bearing 95 on an annular projection 96 of the housing 80. The section 89 of the housing 87 has one side rotatably supported on the annular projection 79 of the housing 80 by a bearing 97. The other side of the section 89 is rotatably supported by a bearing 98 on the member 62.

Thus, the housings 80 and 87 are rotatably supported by the members 62 and 63. Since all of the load is carried by the lower portion of the member 58, the upper portion may be formed of one or more ribs, which extend from the member 62 to the member 63.

The section 88 of the housing 87 has an annular chamber 99 therein to receive at least two cylindrical members (one shown at 100), which function as weight means in the same manner as the cylindrical members 50 and 51 and the cylindrical members 53 and 54 of the modification of FIGURE 3. The cylindrical members or weights in the annular chamber 99 are movable therein since the annular chamber 99 functions as an annular track.

The section 89 of the housing 87 has an annular chamber 101 formed therein in which at least two cylindrical members (one shown at 102) are disposed. The cylindrical members are weight means movable in the annular chamber 101, which serves as an annular track for the cylindrical members.

Since the sections 88 and 89 are unitary, the cylindrical members or weights in the annular chamber 99 and the cylindrical members or weights in the annular chamber 101 rotate in the same direction. They also have the same locus since the annular chambers 99 and 101 have the same outer diameter. This arrangement of the housing 87 into two sections 88 and 89 is necessary to avoid twisting about the vertical axis, which is the axis of rotation of the hub 18.

The housing 80 has an annular chamber 103 therein in which at least two cylindrical members (one shown at 104) are disposed. The members are weight means movable in the annular chamber 103, which functions as an annular track.

Since the outer diameter of the annular chamber 103 is greater than the outer diameters of the annular chambers 99 and 101, the cylindrical members in the annular chamber 103 are disposed at a greater distance from the axes of rotation of the shafts 70 and 81 than the cylindrical members in the annular chambers 99 and 101. Accordingly, the cylindrical members in the annular chamber 103 have a different locus than the cylindrical members in the annular chambers 99 and 101 of the housing 87.

Furthermore, each of the cylindrical members in the annular chamber 103 has a greater weight than each of the cylindrical members in the annular chambers 99 and 101. However, the combined weight of the cylindrical members in the annular chambers 99 and 101 is greater than the weight of the cylindrical members in the annual chamber 103.

Accordingly, the cylindrical members within the housings 80 and 87 provide weight means movable in different loci so that they may cooperate together as counter-rotating components to substantially balance out the vibratory forcing produced in a vertical-lateral plane or a vertical-longitudinal plane at the rotor hub 18 by the rotor blades, 15, 16, and 17. The vibration absorber of FIGURE 8 can balance out only forcing in the vertical-longitudinal or vertical-lateral plane. Thus, if the vibration absorber of FIGURE 8 were considered to be balancing out forcing in the vertical-longitudinal plane, then it would be necessary to rotate the vibration absorber of FIGURE 8 ninety degrees to substantially balance out the forces created in the vertically-lateral plane. This would be accomplished by disconnecting the annular member 57 from the fuselage of the helicopter 10 and rotating the vibration absorber ninety degrees. The annular member 57 would again be secured to the fuselage of the helicopter 10.

Since the housings 80 and 87 rotate in opposite directions, the vibration absorber of FIGURE 8 synthesizes an elliptical locus, which is produced in the vertical-longitudinal plane at the rotor hub 18 by the vibrations created by the rotor blades 15, 16, and 17. That is, the weights within the housings 80 and 87 are creating components of force, which are counter-rotating and have unequal loci. As previously explained with respect to the modification of FIGURE 3, the weights in the housings 80 and 87 could have equal loci.

While each of the annular chambers 99 and 101 and 103 contains at least two cylindrical members or weights, it should be understood that more than two cylindrical members could be disposed in each of the annular chambers if desired. The relationship of the cylindrical members to each other will vary in the same manner, depending on the phase and amplitude of the vibrations, as mentioned with respect to the cylindrical members 50, 51 and 53, 54 of the modification of FIGURE 3.

Likewise, any of the annular chambers 99, 101, and 103 may be partially filled with liquid in the same manner as mentioned with respect to the modification of FIGURE 3. However, in the vibration absorber of FIGURE 8, the cylindrical members always rest on the outer wall of the annular chambers 99, 101, and 103 so that there is not the movement at the start or stop of rotation of the vibration absorber as in the modification of FIGURE 3.

While the vibration absorber of the present invention has been described with its use on a rotor hub having a plurality of articulated rotor blades, it should be understood that the vibration absorber of the present invention may be utilized on any device having a rotating hub and a plurality of radial members, which create vibrations at the rotor hub when rotating. Thus, for example, the vibration absorber of the present invention could be utilized on a ship propeller or an aircraft propeller, for example.

While the housings 22, 25, 80, and 87 have been shown and described as being driven through a gearing arrangement from the rotor hub 18, it should be understood that other suitable rotating means such as synchronous motors connected to each of the housings and driven by a generator connected to the rotor hub 18 for maintaining a constant ratio with the speed of rotation of the hub 18, for example, would be employed.

As mentioned hereinabove, the speed of rotation of the housings 22, 25, 80, and 87 could be other than the product of the speed of rotation of the hub 18 and the number of radial members attached to the hub 18. It is only necessary that the speed of rotation of the housings 22, 25, 80, and 87 be a constant ratio of the speed of rotation of the hub 18. The selected speed of rotation of the housings 22, 25, 80, and 87 would be dependent on the frequency of the forcing, which it is desired to substantially balance out by the vibration absorber of the present invention.

Although the vibration absorber has been described with respect to the counter-rotating housings, it should be understood that a single housing with at least two weights movable therein in an annular track could be employed to balance out certain periodic vibrations such as those having a circular locus, for example, with a frequency different than the speed of rotation of the body subjected to the vibrations.

An advantage of this invention is that no external power supply is required. Another advantage of this invention is that it has a low weight in comparison with the weight of the helicopter; for example, the weight of the vibration absorber for each rotor of a 19,000-pound helicopter would be a maximum of approximately 60 pounds. A further advantage of this invention is that power losses, which are due to vibration, are reduced. Still another advantage of this invention is that it increases the performance of the helicopter by reducing the fatigue of the helicopter crew and reducing the structural fatigue of the helicopter. A still further advantage of this invention is that it is not effected by any changes in the speed of the rotor since it is directly connected thereto. Yet another advantage of this invention is that the vibration absorber is responsive to varying amplitudes or phases of vibrations, which are created at the rotating hub by the rotor blades. A still further advantage of this invention is that it requires no service since it is completely enclosed within a housing, which may be sealed for the life of the device.

For purposes of exemplification, particular embodiments of the invention have been shown and described according to the present understanding thereof. However, it will be apparent that changes and modifications in the arrangement and construction of the parts thereof may be resorted to without departing from the spirit and scope of the invention.

I claim:

1. In combination, a rotating hub, a plurality of radial members attached to said hub for rotation therewith, said radial members being substantially symmetrically disposed with respect to each other, and a vibration absorber for substantially balancing out vibrations created at said hub by said radial members, said vibration absorber including weight means having at least two weights movable in a plane along a circular path of fixed radius, said weights being angularly movable with respect to each other in response to the vibrations being substantially balanced out, and means connected to said weight means to cause rotation of said weight means at a speed equal to a constant ratio of the speed of said hub other that a ratio of one to one.

2. In combination, a rotating hub, a plurality of radial members attached to said hub for rotation therewith, said radial members being substantially symmetrically disposed with respect to each other, and a vibration absorber for substantially balancing out vibrations created at said hub by said radial members, said vibration absorber including first weight means and second weight means, each of said weight means being movable in a plane along a circular path of fixed radius, each of said weight means including at least two weights angularly movable with respect to each other, means connected to said first weight means to cause rotation of said first weight means in one direction at a speed equal to a constant ratio of the speed of said hub, and means connected to said second weight means to cause rotation of said second weight means in the opposite direction to rotation of said first weight means at a speed equal to a constant ratio of the speed of said hub.

3. In combination, a rotating hub, a plurality of radial members attached to said hub for rotation therewith, said radial members being substantially symmetrically disposed with respect to each other, and a vibration absorber for substantially balancing out vibrations created at said hub by said radial members, said vibration absorber including first weight means and second weight means, each of said weight means being movable in a plane along a circular path of fixed radius, each of said weight means including at least two weights angularly movable with respect to each other, means connected to said first weight means to cause rotation of said first weight means in one direction at a speed equal to a constant ratio of the speed of said hub, means connected to said second weight means to cause rotation of said second weight means in the opposite direction to rotation of said first weight means at a speed equal to a constant ratio of the speed of said hub, and said first weight means and said second weight means having their axes of rotation coaxial with each other and with the axis of rotation of said hub.

4. In combination, a rotating hub, a plurality of radial members attached to said hub for rotation therewith, said radial members being substantially symmetrically disposed with respect to each other, and a vibration absorber for substantially balancing out vibrations created at said hub by said radial members, said vibration absorber including first weight means and second weight means, each of said weight means being movable in a plane along a circular path of fixed radius, each of said weight means including at least two weights angularly movable with respect to each other, means connected to said first weight means to cause rotation of said first weight means in one direction at a speed equal to a constant ratio of the speed of said hub, means connected to said second weight means to cause rotation of said second weight means in the opposite direction to rotation of said first weight means at a speed equal to a constant ratio of the speed of said hub, and the locus of said first weight means being different than the locus of said second weight means.

5. In combination, a rotating hub, a plurality of radial members attached to said hub for rotation therewith, said radial members being substantially symmetrically disposed with respect to each other, and a vibration absorber for substantially balancing out vibrations created at said hub by said radial members, said vibration absorber including first weight means and second weight means, each of said weight means being movable in a plane along a circular path of fixed radius, each of said weight means including at least two weights angularly movable with respect to each other, means connected to said first weight means to cause rotation of said first weight means in one direction at a speed equal to a constant ratio of the speed of said hub, means connected to said second weight means to cause rotation of said second weight means in the opposite direction to rotation of said first weight means at a speed equal to a constant ratio of the speed of said hub, said first weight means and said second weight means having their axes of rotation coaxial with each other and with the axis of rotation of said hub, and the locus of said first weight means being different than the locus of said second weight means.

6. In combination, a rotating hub, a plurality of radial members attached to said hub for rotation therewith, said radial members being substantially symmetrically disposed with respect to each other, and a vibration absorber for substantially balancing out vibrations created at said hub by said radial members, said vibration absorber including a first housing, a second housing, each of said housings having an annular track therein, each of said housings having weight means disposed in said annular track, each of said weight means including at least two weights angularly movable relative to each other, means connected to said first housing for causing rotation in one direction, said connected means including means to rotate said first housing at a speed equal to a constant ratio of the speed of said hub, means connected to said second housing for causing rotation in the opposite direction to rotation of said first housing, and said second housing connected means including means to rotate said second housing at a speed equal to a constant ratio of the speed of said hub.

7. In combination, a rotating hub, a plurality of radial members attached to said hub for rotation therewith, said radial members being substantially symmetrically disposed with respect to each other, and a vibration absorber for substantially balancing out vibrations created at said hub by said radial members, said vibration absorber including a first housing, a second housing, each of said housings having an annular track therein, each of said housings having weight means disposed in said annular track, each of said weight means including at least two weights angularly movable relative to each other, means connected to said first housing for causing rotation in the same direction as said hub, said connected means including means to rotate said first housing at a speed equal to a constant ratio of the speed of said hub, means connected to said second housing for causing rotation in the opposite direction to said hub, and said second housing connected means including means to rotate said second housing at a speed equal to a constant ratio of the speed of said hub.

8. In combination, a rotating hub, a plurality of radial members attached to said hub for rotation therewith, said radial members being substantially symmetrically disposed with respect to each other, and a vibration absorber for substantially balancing out vibrations created at said hub by said radial members, said vibration absorber including a first housing, a second housing, each of said housings having an annular track therein, each of said housings having weight means disposed in said annular track, each of said weight means including at least two weights angularly movable relative to each other, means connected to said first housing for causing rotation in one direction, said connected means including means to rotate said first housing at a speed equal to a constant ratio of the speed of said hub, means connected to said second housing for causing rotation in the opposite direction to rotation of said first housing, said second housing connected means including means to rotate said second housing at a speed equal to a constant ratio of the speed of said hub, and the locus of said first weight means being different than the locus of said second weight means.

9. In combination, a rotating hub, a plurality of radial members attached to said hub for rotation therewith, said radial members being substantially symmetrically disposed with respect to each other, and a vibration absorber for substantially balancing out vibrations created at said hub by said radial members, said vibration absorber including at least two housings, each of said housings having an annular track therein, each of said housings having weight means disposed in said annular track, each of said weight means including at least two weights angularly movable with respect to each other, means connected to at least one of said housings for causing rotation in one direction, said connected means including means to rotate said one housing at a speed equal to a constant ratio of the speed of said hub, means connected to at least one other of said housings for causing rotation in the opposite direction of said one housing, and said other housing connected means including means to rotate said other housing at a speed equal to a constant ratio of the speed of said hub.

10. In combination, a rotating hub, a plurality of radial members attached to said hub for rotation therewith, said radial members being substantially symmetrically disposed with respect to each other, and a vibration absorber for substantially balancing out vibrations created at said hub by said radial members, said vibration absorber including at least two housings, each of said housings having an annular track therein, each of said housings having weight means disposed in said annular track, each of said weight means including at least two weights angularly movable with respect to each other, means connected to at least one of said housings for causing rotation in one direction, said connected means including means to rotate said one housing at a speed equal to a constant ratio of the speed of said hub, means connected to at least one other of said housings for causing rotation in the opposite direction to rotation of said one housing, said other housing connected means including means to rotate said other housing at a speed equal to a constant ratio of the speed of said hub, and the locus of said weight means in said one housing being different than the locus of said weight means in said other housing.

11. In a rotary wing aircraft including a rotor hub with a plurality of rotor blades attached thereto for rotation therewith, and a vibration absorber for substantially balancing out vibrations created at said rotor hub by said rotor blades, said vibration absorber including a first housing, a second housing, each of said housings having an annular track therein, each of said housings having weight means disposed in said annular track, each of said weight means including at least two weights angularly movable relative to each other, means connected to said first housing for causing rotation in one direction, said connected means including means to rotate said first housing at a speed equal to a constant ratio of the speed of said rotor hub, means connected to said second housing for causing rotation in the opposite direction to rotation of said first housing, said second housing connected means including means to rotate said second housing at a speed equal to a constant ratio of the speed of said rotor hub, and a housing fixed to the aircraft and enclosing said rotating housings.

12. In a rotary wing aircraft including a rotor hub with a plurality of rotor blades attached thereto for rotation therewith and a vibration absorber for substantially balancing out vibrations created at said rotor hub by said rotor blades, said vibration absorber including a first housing, a second housing, each of said housings having an annular track therein, each of said housings having weight means disposed in said annular track, each of said weight means including at least two weights angularly movable relative to each other, means connected to said first housing for causing rotation in one direction, said connected means including means to rotate said first housing at a speed equal to the product of the speed of said rotor hub and the number of said rotor blades, means connected to said second housing for causing rotation in the opposite direction to rotation of said first housing, said second housing connected means including means to rotate said second housing at a speed equal to the product of the speed of said rotor hub and the number of said rotor blades, and a housing fixed to the aircraft and enclosing said rotating housings.

13. In a rotary wing aircraft including a rotor hub with a plurality of rotor blades attached thereto for rotation therewith and a vibration absorber for substantially balancing out vibrations created at said rotor hub by said rotor blades, said vibration absorber including a first housing, a second housing, each of said housings having weight means therein, each of said weight means including at least two weights angularly movable relative to each other, means connected to said first housing for causing rotation in the same direction as said rotor hub, said connected means including means to rotate said first housing at a speed equal to a constant ratio of the speed of said rotor hub, means connected to said second housing for causing rotation in the opposite direction to said rotor hub, said second housing connected means including means to rotate said second housing at a speed equal to a constant ratio of the speed of said rotor hub, and a housing fixed to the aircraft and enclosing said rotating housings.

14. In a rotary wing aircraft including a rotor hub with a plurality of rotor blades attached thereto for rotation therewith and a vibration absorber for substantially balancing out vibrations created at said rotor hub by said rotor blades, said vibration absorber including a first housing, a second housing, each of said housings having weight means therein, each of said weight means including at least two weights angularly movable relative to each other, means connected to said first housing for causing rotation in the same direction as said rotor hub, said connected means including means to rotate said first housing at a speed equal to the product of the speed of said rotor hub and the number of said rotor blades, means connected to said second housing for causing rotation in the opposite direction to said rotor hub, said second housing connected means including means to rotate said second housing at a speed equal to the product of the speed of said rotor hub and the number of said rotor blades, and a housing fixed to the aircraft and enclosing said rotating housings.

15. In a rotary wing aircraft including a rotor hub with a plurality of rotor blades attached thereto for rotation therewith and a vibration absorber for substantially balancing out vibrations created at said rotor hub by said rotor blades, said vibration absorber including a first housing, a second housing, each of said housings having an annular track therein, each of said housings having weight means disposed in said annular track, each of said weight means including at least two weights angularly movable relative to each other, means connected to said first housing for causing rotation in one direction, said connected means including means to rotate said first housing at a speed equal to the product of the speed of said rotor hub and the number of said rotor blades, means connected to said second housing for causing rotation in the opposite direction to rotation of said first housing, said second housing connected means including means to rotate said second housing at a speed equal to the product of the speed of said rotor hub and the number of said rotor blades, the locus of said first weight means being different than the locus of said second weight means, and a housing fixed to the aircraft and enclosing said rotating housings.

16. In a rotary wing aircraft including a rotor hub with a plurality of rotor blades attached thereto for rotation therewith and a vibration absorber for substantially balancing out vibrations created at said rotor hub by said rotor blades, said vibration absorber including a first housing, a second housing, each of said housings having weight means therein, each of said weight means including at least two weights angularly movable relative to each other, means connected to said first housing for causing rotation in the same direction as said rotor hub, said connected means including means to rotate said first housing at a speed equal to the product of the speed of said rotor hub and the number of said rotor blades, means connected to said second housing for causing rotation in the opposite direction to said rotor hub, said second housing connected means including means to rotate said second housing at a speed equal to the product of the speed of said rotor hub and the number of said rotor blades, the locus of said first weight means being different than the locus of said second weight means, and a housing fixed to the aircraft and enclosing said rotating housings.

17. In a rotary wing aircraft including a rotor hub with a plurality of rotor blades attached thereto for rotation therewith and a vibration absorber for substantially balancing out vibrations created at said rotor hub by said rotor blades, said vibration absorber including a first housing, a second housing, each of said housings having an annular track therein, each of said housings having weight means disposed in said annular track, each of said weight means including at least two weights angularly movable relative to each other, means connected to said first housing for causing rotation in one direction, said connected means including gearing means to rotate said first housing at a speed equal to the product of the speed of said rotor hub and the number of said rotor blades, means connected to said second housing for causing rotation in the opposite direction to rotation of said first housing, said second housing connected means including gearing means to rotate said second housing at a speed equal to the product of the speed of said rotor hub and the number of said rotor blades, the locus of said first weight means being different than the locus of said second weight means, a housing fixed to the aircraft and enclosing said rotating housings, and said fixed housing having means forming part of each of said gearing means.

18. In a rotary wing aircraft including a rotor hub with a plurality of rotor blades attached thereto for rotation therewith and a vibration absorber for substantially balancing out vibrations created at said rotor hub by said rotor blades, said vibration absorber including a first housing, a second housing, each of said housings having weight means therein, each of said weight means including at least two weights angularly movable relative to each other, means connected to said first housing for causing rotation in the same direction as said rotor hub, said connected means including gearing means to rotate said first housing at a speed equal to the product of the speed of said rotor hub and the number of said rotor blades, means connected to said second housing for causing rotation in the opposite direction to said rotor hub, said second housing connected means including gearing means to rotate said second housing at a speed equal to the product of the speed of said rotor hub and the number of said rotor blades, the locus of said first weight means being different than the locus of said second weight means, a housing fixed to the aircraft and enclosing said rotating housings, and said fixed housing having means forming part of each of said gearing means.

References Cited by the Examiner

UNITED STATES PATENTS

| | | | |
|---|---|---|---|
| 2,031,286 | 2/1956 | Stern et al. | 74—574 X |
| 2,353,681 | 7/1944 | Martin et al. | 170—177 |
| 2,371,984 | 3/1945 | Forsyth | 74—574 |
| 2,576,105 | 11/1951 | Childs | 170—159 |
| 2,611,557 | 9/1952 | Donovan | 244—17.11 |
| 2,771,240 | 11/1956 | Gurn | 74—573 X |

FOREIGN PATENTS

| | | |
|---|---|---|
| 1,202,949 | 7/1959 | France. |

JULIUS E. WEST, *Primary Examiner.*